United States Patent [19]

Stange et al.

[11] 4,054,285
[45] Oct. 18, 1977

[54] APPARATUS FOR REGISTERING AND INVERTING SHEETS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 664,846

[22] Filed: Mar. 8, 1976

[51] Int. Cl.$^2$ .............................................. B65H 29/24
[52] U.S. Cl. .............................. 271/186; 271/DIG. 9; 271/195
[58] Field of Search ................. 271/195, 186, DIG. 9, 271/65

[56] References Cited
U.S. PATENT DOCUMENTS

| 3,236,517 | 2/1966 | Lyman | 271/195 X |
| 3,339,705 | 9/1967 | Burkhardt | 271/DIG. 9 |
| 3,405,977 | 10/1968 | Albright | 271/195 X |
| 3,416,791 | 12/1968 | Beckman | 271/65 |
| 3,672,765 | 6/1972 | Altmann | 271/DIG. 9 |

Primary Examiner—Richard A. Schacher
Attorney, Agent, or Firm—Carlos Nieves; James J. Ralabate

[57] ABSTRACT

Apparatus includes a structure having a vertically disposed thin rectangular pocket into which the leading edge of a document is inserted by a roller arrangement. When the document is released by the roller arrangement it registers against the bottom wall of the pocket and a fluid stream provided in the pocket registers the document against a narrow vertical wall of the pocket. The wide walls of the structure are transparent and provide a view of the document which may be used in cooperation with xerographic equipment to produce copies of the document. Another fluid stream in the pocket is used to move the originally trailing edge of the document into engagement with the roller arrangement and the arrangement cooperates with a guide to move the document into a tray. The facing position of a collected document is inverted with respect to its facing position immediately prior to its being fed into the roller arrangement.

7 Claims, 4 Drawing Figures

U.S. Patent     Oct. 18, 1977     4,054,285
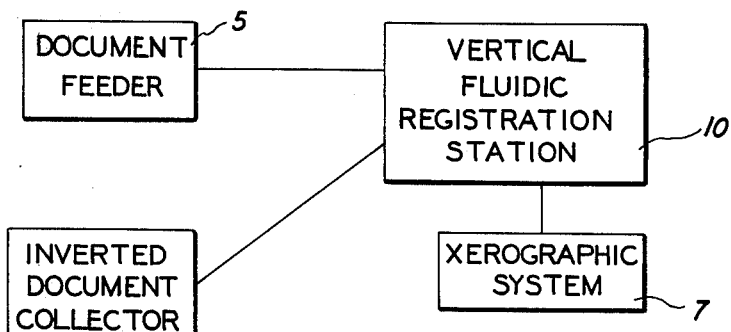
FIG. 1
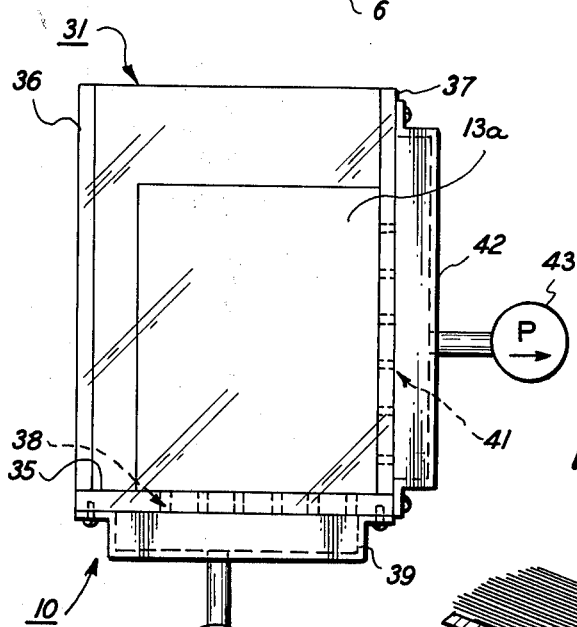
FIG. 4
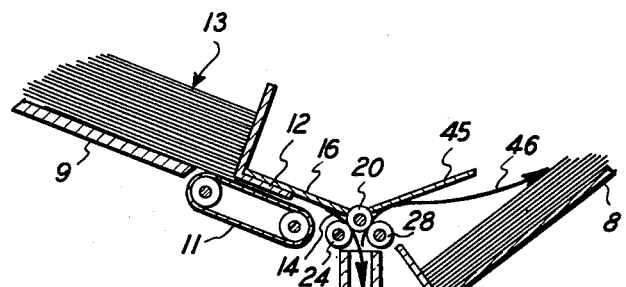
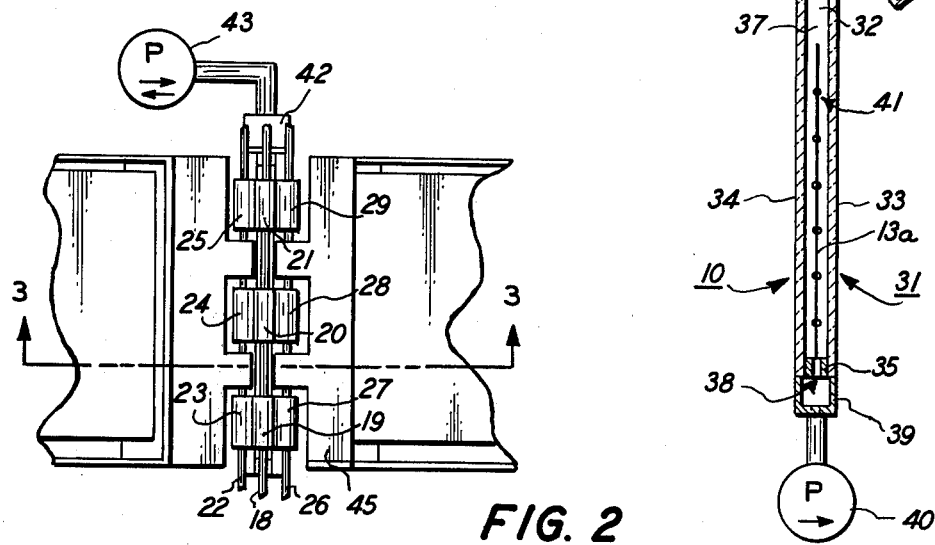
FIG. 2     FIG. 3

APPARATUS FOR REGISTERING AND INVERTING SHEETS

The subject invention relates to apparatus for inverting sheets, such as paper, and to apparatus for posing documents at a station where, for example, xerographic copiers cooperating therewith may be used to provide copies of the documents. In addition, the invention relates to fluidic registration devices, such as disclosed in copending U.S. patent application Ser. No. 627,571, Pneumatic Registration Apparatus, filed on Oct. 31, 1975, on an invention by Klaus K. Stange, the application being assigned to the assignee herein, Xerox Corporation.

As is well known to those familiar with commercial xerographic copiers, copies of documents may be made by placing an original with an image to be copied in contact with a platen, by placing a cover over the located document and platen, and by actuating a button which initiates a machine cycle to produce a copy. In the machine process, a light image of the original is projected onto a charged photoconductive surface to produce a charge image and, subsequently, the charge image is developed with toner. The resulting toner image is thereafter transferred to copy paper and fused, the location of the fused image on the copy paper being dependent on the location of the original document on the platen. Because of this dependency, when it is desired that the location of a fused image on a copy correspond to the location of information on an original document, such document must be located precisely on a predetermined area of the platen. Obviously, this is a time-consuming operation. When it is desired to make copies of a plurality of documents, the cover must be lifted at least once for the substitution of documents on the platen. Further, when both sides of documents must be copied each document must be inverted. Therefore, copying can be a tiring process for a machine operator.

Anent inversion, U.S. Pat. No. 3,416,791, issued on Dec. 12, 1968 to M. K. Beckman et al discloses apparatus for selectively inverting the facing position of a conveyed document. In the apparatus a document is inserted into a receiving chute from a normal path of travel, leading edge first, and withdrawn therefrom into the normal path of travel with the trailing edge becoming the leading edge. A document thus inverted is deflected into the receiving chute by a pivotal member selectively positioned to project into the normal path of travel. The document is withdrawn from the receiving chute and inserted into the normal path of travel by a rotating friction roller which projects into the chute and contact rollers movable into the chute to hold the document in engagement with the friction roller. Movement of the contact rollers is effected by a solenoid responsive to a sensing unit which detects a leading edge of a document in the chute at a predetermined position. It is noted that the presence of the friction roller is a deterent to the use of the chute as an exposure station.

It is an object of the present invention to provide fluidic apparatus for inverting sheets, such as paper.

It is another object of the present invention to provide apparatus for automatically posing or registering sheets bearing information at a station.

It is another object of the present invention to provide apparatus wherein said sheets are automatically fed, posed, inverted and discharged.

A still further object of the present invention is to provide document handling apparatus useful with optical system such as used in xerography to provide light images on photoconductive members.

Structurally, the invention may be implemented with (a) a structure having a vertically disposed pocket; (b) means for serially depositing sheets in the pocket; (c) fluidic means for discharging sheets from the pocket, the discharged sheets being inverted; and (d) means for collecting the inverted sheets.

Additional objects and features of the invention will become apparent by reference to the following description in conjunction with the accompanying drawings, in which:

FIG. 1 is a block diagram of a xerographic system cooperating with apparatus, according to the invention, for posing documents at a station and for inverting the documents;

FIG. 2 is a partial top view of the apparatus;

FIG. 3 is a cross-sectional view of the apparatus taken along lines 3—3 in FIG. 2; and FIG. 4 is a side plan view of a structure of the apparatus, the structure including a pocket and means for providing therein fluid streams.

A system in which the subject invention is incorporated is schematically represented in FIG. 1. Operatively, during a cycle of the system, a document feeder 5 provides a document to a fluidic registration station 10 and the document is posed so that a xerographic system 7 can make a copy of the document. Thereafter, the registration station discharges the document to a document collector 6 which, as shown in FIGS. 2 and 3, may be a tray 8.

Referring to FIGS. 2 and 3, the document feeder may include a bine 10 having, at a bottom edge, a throat, and a friction belt 11 adjacent a separator 12 and the throat for serially advancing documents 13 out of the bottom of the bin. Documents advanced from the bin are constrained to travel, as indicated by arrow 14, into engagement with a roller arrangement 15 by a guide 16. The roller arrangement includes a driven rod 18 on which rollers 19-21 are secured and a fixed rod 22 on which idler rollers 23-25 are rotatably mounted, rollers 19-21 cooperating with rollers 23-25, respectively, to provide nips for feeding documents. Further, the roller arrangement includes a fixed rod 26 on which idler rollers 27-29 cooperate with rollers 19-21 to provide nips for discharging documents, as more fully described below, moving out of the fluidic registration apparatus 10. From the foregoing, it will be appreciated that only one source (not shown) is required to power the roller arrangement. Other document feeders may be used within the spirit of the invention. For example, U.S. Pat. No. 3,768,803, issued on Oct. 30, 1973, on an invention by K. K. Stange, sets forth sheet feeders which may be used to automatically feed documents.

Fluidic registration apparatus 10 is more specifically shown in FIGS. 3 and 4. Typically, the apparatus includes a rectangular structure 31 having a vertically disposed pocket 32. Structure 31 includes a vertically disposed pair of, in this example, transparent parallel plates 33 and 34, a rectangular member 35 located between the plates along bottom end sections, and a parallel pair of spaced rectangular members 36 and 37 extending vertically along side end sections of the plates. Members 35-37 are fixed to the plates with, for example, an adhesive to define narrow side walls and a bottom wall for the pocket. Member 35 includes a linearly aligned group of ports 38 and supports a manifold 39 whose chamber communicates with the pocket via the group of ports. Manifold 39 is coupled to a pump 40 and, therefore, fluid may be injected into the pocket. Similarly, member 37 includes a group of ports 41 and supports a manifold 42 whose chamber communicates with the pocket via ports 41. Manifold 42 is coupled to a vacuum pump 43 and, consequently, may be used to draw fluid from the pocket.

Operatively, a document, such as 13a, fed into the pocket by rollers 19-21 and 23-25 may be allowed to drop against bottom wall 35 and may be drawn by a fluid stream generated by pump 43 into abutment with side wall 37. Thereafter, the registered document may be "looked at" by the xerographic system to produce copies. When the document is no longer required in the pocket fluid from pump 40 is injected into the pocket and the document is blown upwardly into engagement with rollers 19-21 and 27-29. The engaged document is constrained to travel, as indicated by arrow 46, into tray 8 by a guide 45 and since the originally trailing edge of the document becomes the leading edge it should be apparent that the document has been inverted. It should be noted that once a document is being moved out of the pocket by the roller arrangement another document may be moved, simultaneously, into the pocket by the roller arrangement. Further, it should be noted that pump 43 may be a positive pressure pump if registration against wall 36 is desired. Obviously, pump 43 may be a reversible pump if it is desired to give a user of the system the option of registering against either of the narrow walls.

The use of transparent plates 33 and 34 permits copying of either or both sides of a document in the pocket. However, one of the plates may be manufactured from other materials and may be coated to provide a reflective background for a document in the pocket. Obviously, if the apparatus described is only to be used to invert documents, the plates need not be transparent. In such circumstances, if the orthogonal registration described above is not desired, the ports 41, manifold 42, and pump 43 may be dispensed with.

It is to be understood that the description herein of apparatus arranged according to the invention, defined in the following claims, has been set forth to facilitate comprehension of the invention and should not be interpreted so as to place limitations on the claims.

What is claimed is:
1. Apparatus, comprising:
   a. a structure having a verically disposed pocket, said pocket being defined by a pair of wide walls bounded by oppositely disposed narrow side walls and a narrow bottom wall;
   b. means for serially dropping sheets having any one of a range of sizes in the pocket;
   c. fluidic means for discharging sheets from the pocket, including at least one port in the bottom wall and means for injecting fluid through said at least one port to provide a fluid stream in the structure which discharges sheets therein,
   d. means for collecting discharged sheets; and
   e. means for guiding discharged sheets to said collecting means, whereby the serially deposited sheets are inverted.
2. Apparatus as defined in claim 1 wherein said means for injecting fluid includes a manifold coupled to the bottom wall of the structure, the manifold having a chamber communicating with said at least one port; and a fluid pump coupled to the manifold.
3. Apparatus as defined in claim 1 wherein one of the wide walls has at least a fluid impervious and transparent section, whereby a a substantial part of a sheet in the pocket may be viewed.
4. Apparatus as defined in claim 1 further including means for registering sheets deposited in the pocket against one of the pockets' narrow side walls.
5. Apparatus as defined in claim 4 wherein said means for registering sheets includes a manifold coupled to either one of the pockets' narrow side walls, the manifold having a chamber; at least one port in the structure coupling the chamber to the pocket; and a fluid pump coupled to the manifold.
6. Apparatus as defined in claim 4 wherein one of the wide walls has at least a fluid impervious and transparent section, whereby a substantial part of a sheet in the pocket may be viewed.
7. Apparatus as defined in claim 6 wherein said bottom wall is orthogonally related to said one of the pockets' narrow side walls, whereby rectangular sheets may be orthogonally registered.

* * * * *